US011176491B2

(12) United States Patent
Bettencourt-Silva et al.

(10) Patent No.: US 11,176,491 B2
(45) Date of Patent: Nov. 16, 2021

(54) INTELLIGENT LEARNING FOR EXPLAINING ANOMALIES

(71) Applicant: INTERNATIONAL BUSINESS MACHINES CORPORATION, Armonk, NY (US)

(72) Inventors: Joao H. Bettencourt-Silva, Dublin (IE); Vanessa Lopez Garcia, Dublin (IE); Valentina Rho, Dublin (IE); Theodora Brisimi, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 483 days.

(21) Appl. No.: 16/158,030

(22) Filed: Oct. 11, 2018

(65) Prior Publication Data

US 2020/0118041 A1    Apr. 16, 2020

(51) Int. Cl.
*G06N 20/00*     (2019.01)
*G06N 5/04*      (2006.01)

(52) U.S. Cl.
CPC ............. *G06N 20/00* (2019.01); *G06N 5/048* (2013.01)

(58) Field of Classification Search
None
See application file for complete search history.

(56) References Cited

U.S. PATENT DOCUMENTS

2005/0021357 A1*  1/2005  Schuetze ............... G06Q 10/10
                                                      706/45
2015/0356252 A1  12/2015  Beker
2017/0193174 A1   7/2017  Allen et al.
2018/0096103 A1   4/2018  Allen et al.
2020/0396244 A1* 12/2020  Paturi .................. G06K 9/6256

OTHER PUBLICATIONS

Discovering and Explaining Abnormal Nodes in Semantic Graphs, Published in: IEEE Transactions on Knowledge and Data Engineering (vol. 20, Issue: 8, Aug. 2008), pp. 1039-1052.*

* cited by examiner

*Primary Examiner* — Stanley K. Hill
(74) *Attorney, Agent, or Firm* — Griffiths & Seaton PLLC

(57) ABSTRACT

Embodiments for intelligent learning for explaining anomalies to a user by a processor. One or more anomalous records may be identified in a knowledge base. A list of ranked candidate explanations may be generated for the one or more anomalous records. An active learning dialog may be initiated with one or more users to increase accuracy of the knowledge base, a domain knowledge, and each of the ranked candidate explanations.

17 Claims, 6 Drawing Sheets

INTELLIGENT LEARNING FOR EXPLAINING ANOMALIES

BACKGROUND OF THE INVENTION

Field of the Invention

The present invention relates in general to computing systems, and more particularly to, various embodiments for intelligent learning for explaining anomalies by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, many individuals require extensive use of technology relating to the health and the medical field.

Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, the greater the need to make progress in these systems advantageous for efficiency and safety such as, for example, for using the vast amount of available data to recognize impacts on a health state or health of a person.

SUMMARY OF THE INVENTION

Various embodiments for intelligent learning for explaining anomalies to a user using one or more processors, are provided. In one embodiment, by way of example only, a method for implementing intelligent learning for explaining anomalies to a use, again by a processor, is provided. One or more anomalous records may be identified in a knowledge base. A list of ranked candidate explanations may be generated for the one or more anomalous records. An active learning dialog may be initiated with one or more users to increase accuracy of the knowledge base, a domain knowledge, and each of the ranked candidate explanations.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
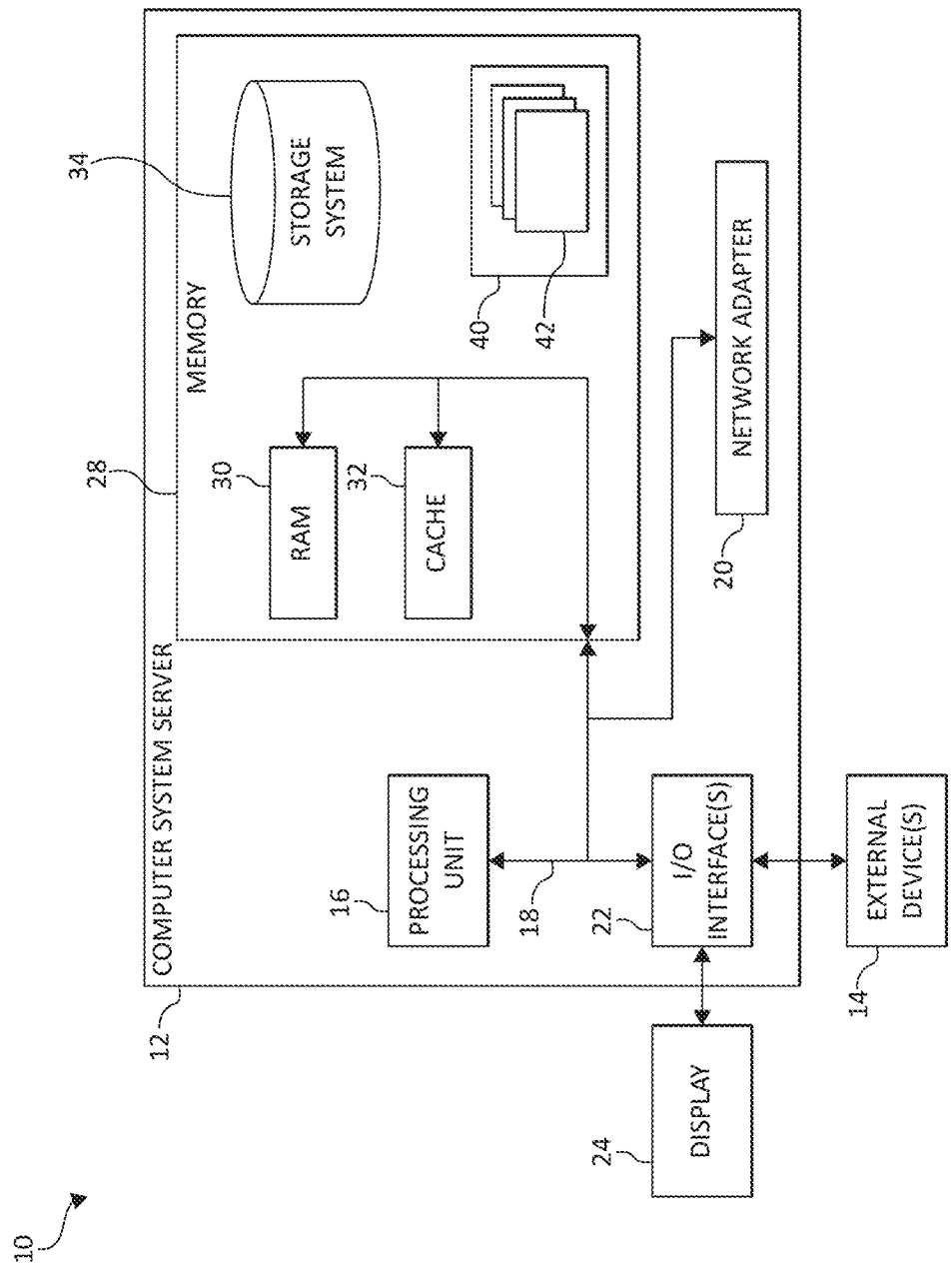
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include computers, smartphones, laptops, home appliances, audio systems, televisions, security cameras, security sensors, among countless other examples. Such IoT computing systems may be employed in dialog systems, energy systems (e.g., energy grids), water networks, traffic networks, smart buildings, and the like.

For example, dialog systems can play a key role in the functioning of an organization, such as a business, government, group or other entity. For example, many critical decisions may result from discussions in chat systems, or chat-like conversation systems or chatbots. A chatbot may be an operation which conducts a dialog or conversation, audible, visual, and/or via textual methods. Various entities and/or industries (e.g., the healthcare industry) may seek to capture and analyze these decisions to make various improvements to a structure of the organization. For example, a need exist to leverage a dialog system to improve the quality of data stored in electronic medical records, clinical data warehouses or other clinical systems as well as helping to consolidate new knowledge from a domain experts' current practice. In turn, this will help physicians make better decisions based on more accurate information.

Accordingly, the present invention provides for implementing intelligent learning (e.g., active learning) for explaining anomalies to one or more users in a computing environment. One or more anomalous records may be identified in a knowledge base. The records may be electronic medical records ("EMRs"). A list of ranked candidate explanations may be generated for the one or more anomalous records. An active learning dialog may be initiated with one or more users to increase accuracy of the knowledge base, a domain knowledge, and each of the ranked candidate explanations.

For example, the present invention provides for a cognitive system that may apply an anomaly detection operation to identify records that may have an anomaly and generate one or more explanations explaining the detected anomalous records by combining evidence that 1) may be extracted from a domain knowledge, 2) may be acquired from machine learning and active learning from one or more users (e.g., domain experts) through a dialog operation to fill in existing gaps in a knowledge base.

The cognitive system learns (e.g., learn and augments a knowledge base such as, internal, operational, and historical data and/or an external domain knowledge) by engaging in a dialog with a correct/right domain expert/user(s) with the purpose of validating and ranking potential explanations for the anomalies detected on data (e.g., a data entry error). The cognitive system may be applied to one or more domains (e.g., healthcare domain), specifically health informatics and data quality checking (in terms of consistency, plausibility, concordance, validity, accuracy) on clinical knowledge bases, where data is being constantly updated from multiple sources (e.g., patients' profile and lab test results). To further illustrate, consider the following examples.

Example 1

The cognitive system may detect an anomaly in data input into a knowledge base having health data and possibly domain knowledge. In one example, the system flags an anomalous record that has been recently added to the data (e.g., an outlier). More specifically, the cognitive system detects an anomaly in a patient profile, such as a new value measure of low-density lipoprotein ("LDL"), which has suddenly dropped with respect to the average of the last lab measurements for the same patient.

Example 2

The cognitive system may generate candidate hypotheses and evidence that may explain the anomaly based on a domain knowledge and/or historical data from other similar patients that could explain the anomalous behavior (e.g., anomalous record).

More specifically, the cognitive system may search the domain knowledge to identify one or more possible causes that can explain a drop in LDL in the patient in a short time (e.g., starting a new medication). If the cognitive system has other patients with similar profile in the knowledge base, who also exhibited a similar (or related) anomalous behavior in the past, the cognitive system may apply one or more machine learning ("ML") operations to suggest possible explanations.

Example 3

The cognitive system may rank (e.g., assign a weighted value) among the previously generated candidate explanations for the detected anomaly based on 1) a confidence of the cognitive system for each explanation (i.e., how likely is that explanation?) and/or whether the candidate explanations are generated from the ML operations and/or the domain knowledge, or a combination thereof, and/or 2) based on the confidence of the evidence found in each of the facts involved in each explanation in the records.

More specifically, the cognitive system may provide explanation "A" that states/indicates in some cases treatment drug Y may interact with the LDL values after a few weeks of taking the drug (e.g., 20% confidence—it happened only in 20% of known cases of patient with similar profiles). The cognitive system knows the patient has X disease (e.g., 100% confidence, which is a fact in the knowledge base). X disease has drug Y as treatment (e.g., 100% confidence, which is a fact from the domain model). The patient takes drug Y (e.g., unknown fact), and/or provide explanation "B" that states/indicates an administrative error (or an error on the input data) (e.g., 50% chance for lab measurements).

Example 4

The cognitive system may engage/initiate a conversation flow with one or more appropriate user(s) (e.g., doctor, patient) to ask questions about any missing knowledge. As such, the cognitive system may validate the possible explanation.

Example 5

If the explanation is accepted, the cognitive system augment the knowledge base with the explanation (e.g., the cognitive system learns new knowledge).

More specifically, for example, 4 and 5, the cognitive system may query/ask the patient: "Are you medicating with drug X?" If the answer is positive, the cognitive system may query/ask the user for additional information, if needed, such as, for example: "Since when? What dosage and frequency?" The patient may confirm the use of the medication; therefore explanation "A" becomes a most likely explanation (as compared with explanation "B"). The cognitive system may query/ask the doctor to confirm the validity of one of the automatically extracted facts for which the cognitive system is not 100% confident such as, for example: "Does drug X lower LDL values?" If the doctor validates the fact, the cognitive system may augment both the knowledge base about the domain (e.g., the link between drug X and lower LDL values) and the knowledge base about the patient records (e.g., the use of a drug X since the time given as answer by the user).

Thus, the present invention provides a cognitive system that builds a core recommendation model (e.g., a machine learning model) to generate evidence to explain an anomaly by leveraging heterogeneous, historical input data about a set of records (e.g., patient population, which may consider multiple patients/cases, etc.) and domain knowledge (e.g., structured data and unstructured data). Such heterogeneous data may include, for example, non-medical data such as context, social factors, habits, activity of daily living "ADLs".

The present invention may validate and rank the candidate evidence given to explain anomaly detection obtained from the domain knowledge and ML (in addition to the historical data) by engaging in a dialog/conversation with the user (e.g., performing an active learning operation). The present invention may incorporate the answers provided in the dialog given by users to obtain (e.g., re-rank) and present the optimal evidence as well as to augment a knowledge base and/or knowledge domain with the new information, which may previously be missing, absent, and/or incomplete.

In an additional aspect, various mechanisms of the illustrate embodiments build a recommendation model by leveraging heterogeneous historical input data about both a single patient and also a population of patients (e.g., a selected number of patients). Such heterogeneous data may also include non-medical data such as, for example, contextual data, social factors, behavior patterns and/or habits, and/or ADLs. In one aspect, the present invention progressively refines the recommendation model by considering feedback from one or more domain knowledge experts, a machine learning operation, or a combination thereof. The feedback may include updated information that may be missing from a knowledge base and/or knowledge domain, approvals, rejections, and/or rankings of previous recommendations. Thus, the system for intelligent recommendation of usefulness medical actions provides an interactive responsive system that reacts when a domain knowledge expert decides on one or more medical actions for a patient and suggests more optimal alternative when available. A machine learning mechanism may use the heterogeneous historical input and/or feedback information to build the recommendation model and also learn the health state of one or more patients.

In one aspect, the feedback data may also be collected from one or more IoT devices or sensors such as, for example, smart phones, wearable devices or sensors (e.g., proximity sensors, cameras, radio frequency identification "RFID" readers, biometric sensors, wearable sensors, and the like). Also, as used herein, sensors may include proximity sensors, cameras, radio frequency identification "RFID" readers, biometric sensors, wearable sensors, computers, handheld devices (e.g., Global Positioning System "GPS" device or step counters), smart phones, and/or other sensor based devices.

In one aspect, the health state may include at least one or more medical conditions of one or more users, a health state (e.g., subjective health state "SWB", emotional health state, mental health state, physical health state, or an overall health state) of the one or more users, an emotional state of the one or more users, biometric data, behavior patterns, a health profile of the user, or a combination thereof. In one aspect, health state may be generally described as a normal/standardized or satisfactory condition of existence of the user or a state characterized by health, happiness, emotional stability, mental stability, physical stability, or success. As one of ordinary skill in the art will appreciate, "health state" may be dependent on a number of factors, including such factors as medical condition, emotional stability, mental stability, physical stability, financial stability, a degree or level of happiness, or other factors that may be learned. A health state of a user/patient may be defined. For example, a knowledge base or ontology may be used to define a health state for a user/patient and may include defining and/or indicating one or more correlations between a health state, a plurality of states, medical conditions, activities of daily living (ADL), and context of daily living (CDL).

Moreover, as used herein, ADLs may refer to the most common activities that people perform during a day. For example, activities of daily living may include many activities that take place throughout the day, particularly going to work, child-care, elderly care, health management, communication management, financial management, safety/emergency responses, shopping, visiting friends or family, traveling, housekeeping, grooming or personal hygiene practices, meal preparation/dining out, engaging in social media, and even using a computer. ADLs may also be used in terms of healthcare to refer to the person's daily self-care activities. The context of daily living ("CDL" or "CDLs") may refer to the context in which one or more ADLs are executed or carried out. The CDL may also include one or more dimensions such as, for example, time, location, environment conditions, weather conditions, traffic conditions, and the like. A knowledge domain may provide one or more correlations or relationships between a person's health state and the ADLs and CDLs.

Some ADLs may also be applicable for one or more types of specific events. For example, a person having experienced a recent surgical procedure may require different or altered ADLs for treatment, recovery, or even resuming previously enjoyed ADLs. Each organism (e.g., person) may have different ADLs than other persons. Accordingly, the ADLs for each person may be learned, identified, and analyzed. In one aspect, the ADLs for a person may be learned such as, for example, using machine learning or using a knowledge domain relating to information about the person's activities and behaviors, which may be stored in a patient profile.

It should be noted as described herein, the term "cognitive" (or "cognition") may be relating to, being, or involving conscious intellectual activity such as, for example, thinking, reasoning, or remembering, that may be performed using machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more problems, domains, events, operations, or processes. Thus, the cognitive model may, over time, develop semantic labels to apply to observed behavior, domains, problems, and use a knowledge domain or ontology to store the learned observed behavior, problems, and domain. In one embodiment, the system provides for progressive levels of complexity in what may be learned from the one or more dialogs, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identifying problems, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It should be noted that a cognitive system may also perform one or more calculations that may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more medium/means. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
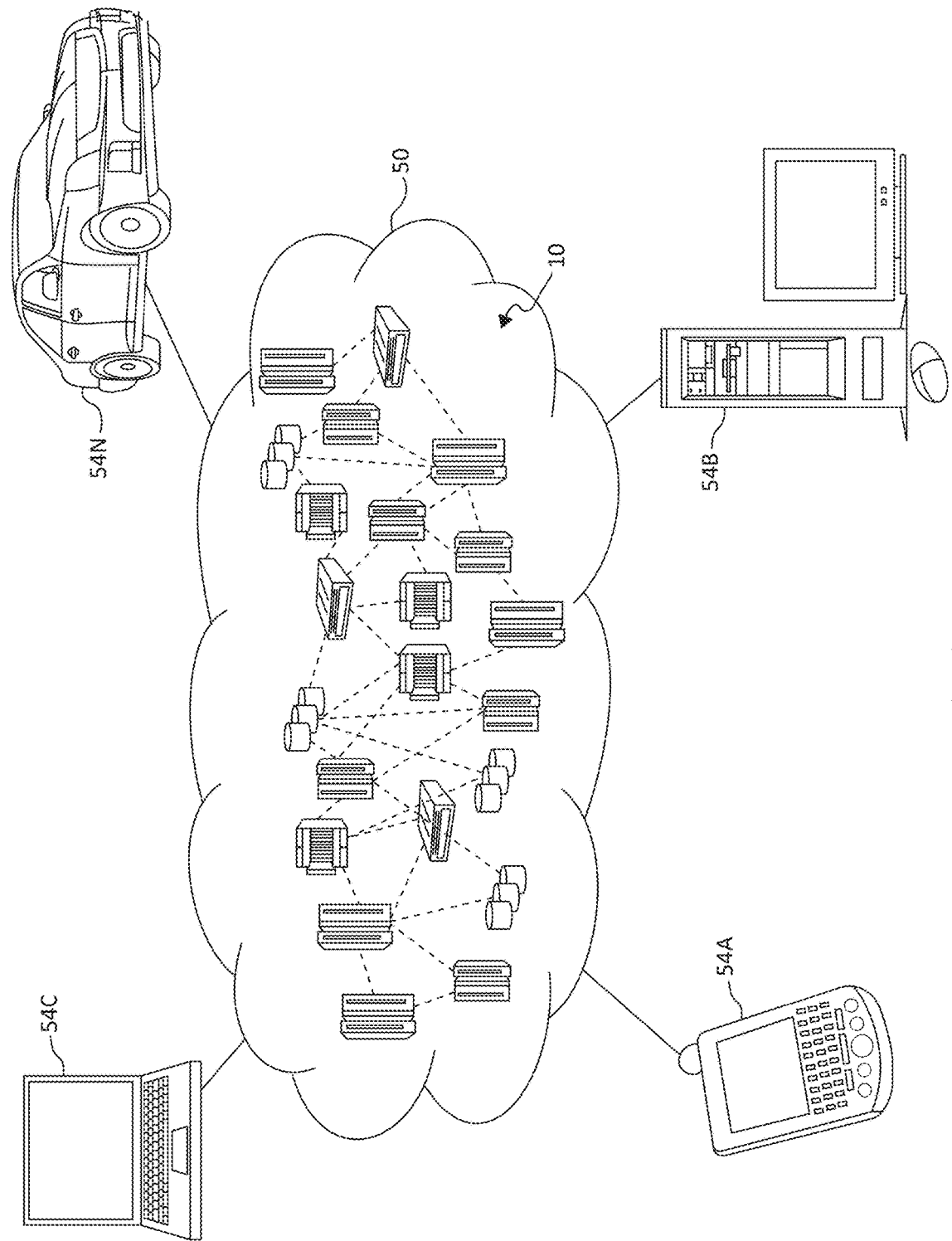
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
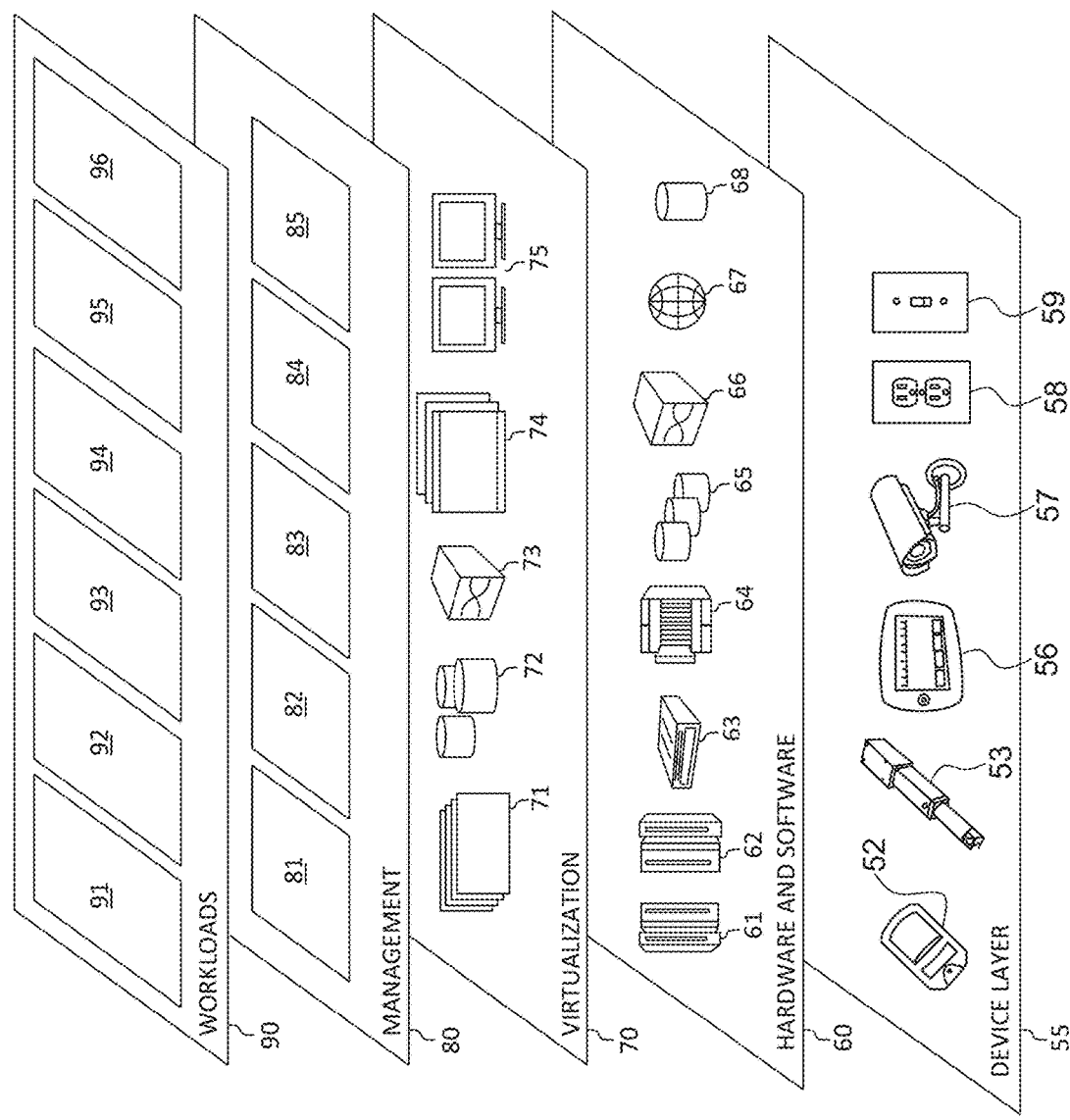
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent learning for explaining anomalies. In addition, workloads and functions 96 for intelligent learning for explaining anomalies may include such operations as data analytics, data analysis, and as will be further described, notification functionality. One of ordinary skill in the art will appreciate that the workloads and functions 96 for intelligent learning for explaining anomalies may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for a cognitive system that provides intelligent learning for explaining anomalies. These mechanisms include functionality that use as input into the cognitive system 1) a domain knowledge, 2) a knowledge base with data records and historical data, and/or 3) one or more answers (e.g., user answers) to various queries and additional feedback. Using the collected input data, the cognitive system may identify and/or discover one or more anomalies in the data sources, with a list of ranked and weighted explanations explaining the anomalies in the data. The cognitive system may provide evidence for each explanation (e.g., set of facts, reasoning, and/or hypotheses, etc.). One or more queries/questions may be issued/asked to one or more users (e.g., doctor, patient, domain expert) to fill in any missing, uncertain, and/or incomplete information relating to the candidate data (e.g., to validate the explanations and augment the knowledge base/knowledge domain if the knowledge base/knowledge domain is insufficient to validate and/or generate a complete and/or complete explanation with a certain confidence). The cognitive system may use the additional knowledge to improve the knowledge base(s), either by adding new facts or relations, and/or by updating existent relations (e.g., existent facts or relations in the knowledge base and/or in the clinical data) if the existent relations were (partially) outdated or invalid.

Figure 4:
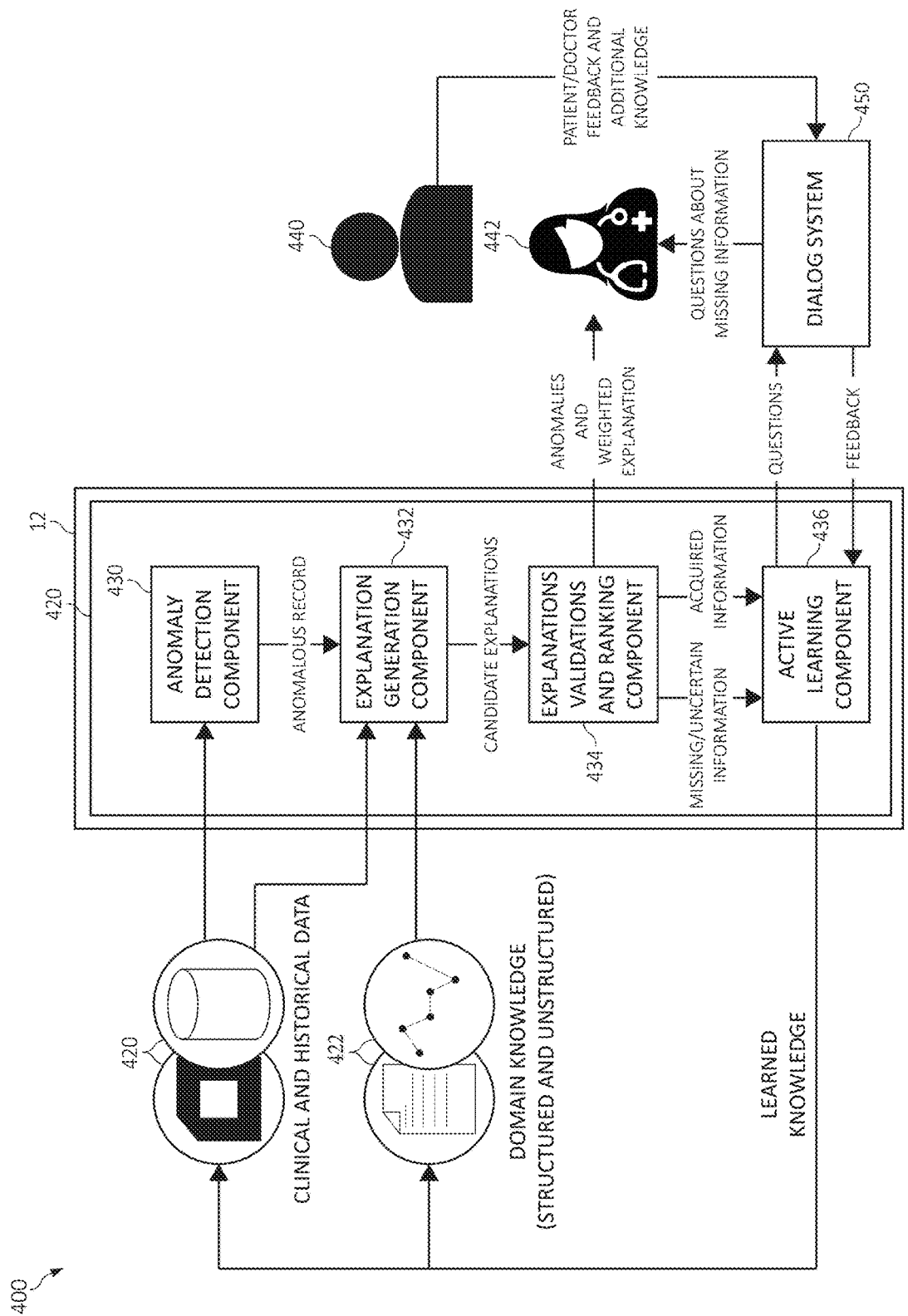
FIG. 4 is an additional block diagram depicting an exemplary functional relationship between various aspects of the present invention.

Turning now to FIG. 4, a block flow diagram depicting exemplary functional components 400 according to various mechanisms of the illustrated embodiments is shown. FIG. 4 illustrates intelligent learning for explaining anomalies workloads and functions and active learning in a computing environment, according to an example of the present technology. As will be seen, many of the functional blocks may also be considered "modules" or "components" of functionality, in the same descriptive sense as has been previously described in FIGS. 1-3.

With the foregoing in mind, the module/component blocks of computing system 400 (e.g., a cognitive system) may also be incorporated into various hardware and software components of a system for intelligent learning for explaining anomalies in accordance with the present invention. Many of the functional blocks 400 may execute as background processes on various components, either in distributed computing components, or on the user device, or elsewhere.

The computing system 400 may include computer system/server 12 of FIG. 1 and the computer system/server 12 of FIG. 1 may include an intelligent learning for explaining anomalies system 402. The computing system 400 may also include a knowledge base 420, a knowledge domain 425, each of with may be in communication with the computer system/server 12 of FIG. 1.

The intelligent learning for explaining anomalies system 402 may include an anomaly detection component 430, an explanation generation component 432, an explanations validation and ranking component 434, an active learning component 436, and a dialog system 450, each of which may be in communication with each other. In one aspect, various component of computer system/server 12 of FIG. 1 may be used to control and/or operate one or more components of the intelligent learning for explaining anomalies system 402.

For example, the intelligent learning for explaining anomalies system 402 may be internal and stored within the computer system/server 12 of FIG. 1, and/or may be external to, but in communication, with the computer system/server 12 of FIG. 1. In one aspect, the computer system/server 12 of FIG. 1 may provide virtualized computing services (i.e., virtualized computing, virtualized storage, virtualized networking, etc.) for one or more components of the computing system 400. More specifically, the computer system/server 12 of FIG. 1 may provide virtualized computing, virtualized storage, virtualized networking and other virtualized services that are executing on a hardware substrate.

In one aspect, the anomaly detection component 430 may perform an anomaly detection operation. The anomaly detection component 430, and/or the explanation generation component 432, may receive data relating to the knowledge base 420 (e.g., a one or more patient records).

The anomaly detection component 430 may identify and/or flag anomalous records present in the data (from the knowledge base 420). The explanation generation component 432 may generate one or more candidate explanations for the anomaly (e.g., the anomalous records).

In one aspect, the explanation generation component 432 may use the domain knowledge 422 (e.g., structured and/or unstructured data) to generate one or more possible/potential explanations. In another aspect, the explanation generation component 432 may use a recommendation operation (e.g., collaborative filtering), which is trained on historical data about patients (e.g., using a clustering operation such as, for example, K-Means clustering or a variation thereof and/or any other suitable clustering operation(s)).

The explanations validation and ranking component 434 may receive the one or more possible/potential candidate explanations from the explanation generation component 432. The explanation generation component 432 may rank the candidate explanations using a ranking operation that weighs each candidate explanation. The explanations validation and ranking component 434 may determine (e.g., compute) a global confidence score for each of the current candidate explanations. The global confidence score combines and aggregates individual confidence scores by combining 1) combining each confidence score (e.g., a degree of likeness) assigned/generated for each candidate explanation (e.g., a score generated/provided by a machine learning operation, and/or provided by the domain knowledge 422), and/or 2) by using a level of strength of the combined evidence in the data of the knowledge base 420 (e.g., clinical data/records and/or historical data/records) or using associations (e.g., a distance) that may connect and/or relate to the evidence (e.g., a computing system does not know if the user takes the drug but knows the patient has a disease that can be treated by the drug, etc.). Thus, the global confidence score combines and aggregates individual confidence scores by combining 1 and 2. In one aspect, a scoring operation may assig a value such as, for example a percentage and/or a value within a range of values, and/or The active learning component 436 may receive missing and/or uncertain information from the explanations validation and ranking component 434 and/or provide to the explanations validation and ranking component 434 acquired information from the dialog system 450.

More specifically, the active learning component 436 may employ machine learning operations to perform one or more machine learning operations for active learning. The active learning component 436 may use one or more machine learning operations to engage and/or communicate with the dialog system 450. In one aspect, the dialog system 450 may be a chatbot used to interact with the one or more users such as, for example, users 442 and/or 440 (e.g., front end) and gather the information needed by a learning component (not shown for illustrative convenience) of the dialog system 450.

The active learning component 436 may use the dialog system 450 to query/ask questions to one or more users such as, for example user 442 and/or user 440, needed to fill in any knowledge gaps in the knowledge base 420 (e.g., missing, uncertain, and/or incomplete data) required to validate an explanation (e.g., actively learning). The acquired knowledge from the dialog system 450 may be used to enhance the current domain knowledge 422 and the knowledge base 420 with the patient records. Also, the dialog system 450 may receive feedback data from user 440 (and/or user 442) (e.g., a doctor or patient) for acquiring additional knowledge. The dialog system 450 may provide the acquired data (e.g., feedback/answers to each query) to the active learning component 436, which may be then passed on and shared with the knowledge base 420 and/or the knowledge domain 425.

In one aspect, the knowledge domain 425 may be an ontology of concepts representing a domain of knowledge. A thesaurus or ontology may be used as the knowledge domain 425. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects. Additionally, the domain knowledge 422 may include structured data, such as, for example, knowledge graphs, various models (e.g., list of drugs, treatments and/or side effects, etc.), unstructured data such as, for example, books and scientific literature, etc. The knowledge base 420 may include data records and historical data (e.g., EMR clinical history or other relevant contextual history such as, for example, ADLs, exercise, diet, sex, gender, other demographics, social determinants, etc., for all patients (historical patients) and the current patient).

Additionally, the active learning component 436 may send the data collected from the dialog system 450 back to the explanations validation and ranking component 434. The explanations validation and ranking component 434, in association with the active learning component 436, may validate and rank the candidate evidence based on the responses/feedback data received from the dialog system 450. That is, the candidate evidence may be re-ranked by the explanations validation and ranking component 434 according to one or more responses provided by the one or more users (e.g., users 440 and/or 442) during the active learning dialog operation with the active learning component 436 and the dialog system 450. The knowledge base 420 and/or the knowledge domain 425 may be updated with the re-ranked candidate evidence. The re-ranked candidate evidence may be presented to a selected user in a graphical user interface ("GUI") such as, for example, a user equipment ("UE") such as, for example the PDA and/or cellular telephone 54A, the desktop computer 54B, the laptop computer 54C, and/or computer system 54N.

In one aspect, the machine learning modeling and/or operations, as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, naïve bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5:
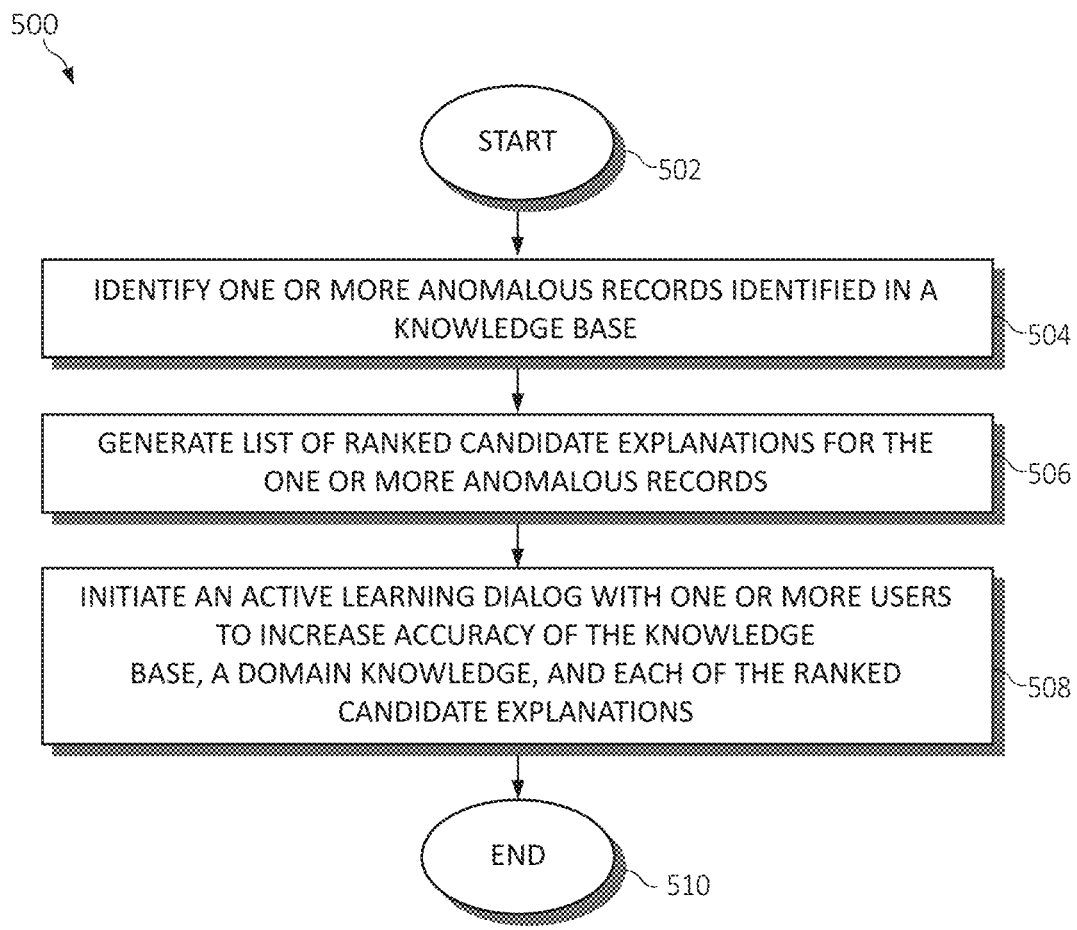
FIG. 5 is a flowchart diagram depicting an exemplary method for implementing intelligent learning for explaining anomalies in which aspects of the present invention may be realized.

Turning now to FIG. 5, a method 500 for intelligent learning for explaining anomalies by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502.

One or more anomalous records may be identified in a knowledge base, as in block 504. A list of ranked candidate explanations may be generated for the one or more anomalous records, as in block 506. An active learning dialog may be initiated with one or more users to increase accuracy of the knowledge base, a domain knowledge, and each of the ranked candidate explanations, as in block 508. The functionality 500 may end, as in block 510.

Figure 6:
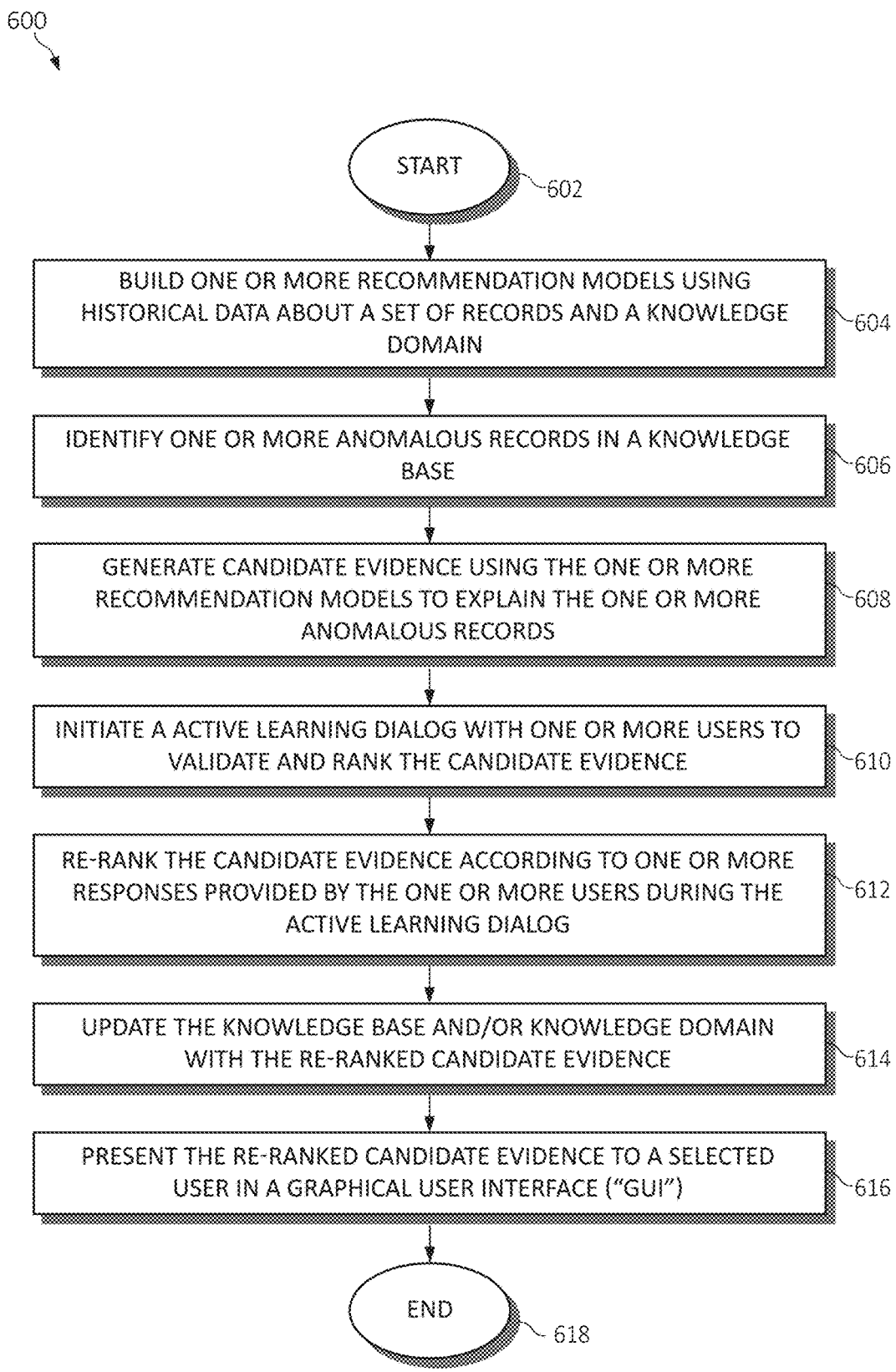
FIG. 6 is an additional flowchart diagram depicting an exemplary method for implementing intelligent learning for explaining anomalies by a processor, again in which aspects of the present invention may be realized.

Turning now to FIG. 6, a method 600 for intelligent learning for explaining anomalies by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

One or more recommendation models may be built (e.g., generated) using historical data about a set of records and a knowledge domain, as in block 604. One or more anomalous records may be identified in a knowledge base, as in block 606. Candidate evidence may be generated using the one or more recommendation models to explain the one or more anomalous records, as in block 608. An active learning dialog may be initiated with one or more users to validate and rank the candidate evidence, as in block 610. The candidate evidence may be re-ranked according to one or more responses provided by the one or more users during the active learning dialog, as in block 612. The knowledge base and/or the knowledge domain may be updated with the re-ranked candidate evidence, as in block 614. The re-ranked candidate evidence may be presented to a selected user in a graphical user interface ("GUI"), as in block 616. The functionality 600 may end, as in block 618.

In one aspect, in conjunction with and/or as part of at least one block of FIGS. 5-6, the operations of methods 500 and/or 600 may include each of the following. The operations of methods 500 and/or 600 may reason and interact with a patient, domain knowledge expert, and/or machine learning operations for collecting the feedback information. The operations of method 600 may refine, update, adjust, and/or modify the recommendation model for recommending the one or more explanations/evidence according to feedback data collected from a machine learning operation, a domain knowledge expert, or a combination thereof.

The operations of method 600 may generate each of the ranked candidate explanations according to a knowledge domain, one or more recommendation models, one or more statistical models, one or more machine learning models, one or more rule-based models, one or more reasoning models, or a combination thereof. The operations of method 600 may rank each of the ranked candidate explanations according to a weight and a confidence score, and/or rank each of the ranked candidate explanations according to a level of confidence of evidence in the knowledge base associated with each of the ranked candidate explanations.

The operations of method 600 may update the knowledge base using feedback from the one or more users and/or build one or more recommendation models to generate evidence to support each of the ranked candidate explanations.

In an additional aspect, the operations of method 600 may also include initializing a machine learning mechanism to trigger active learning and/or use the feedback information to learn and/or train a recommendation model. Also, the machine learning mechanism may learn, approve, reject, rank, or recommend the each of the ranked candidate explanations and the evidence, wherein the evidence includes a set of similar cases from other patients or domain experts, domain experts, the domain knowledge, the historical data, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent learning for explaining anomalies by a processor, comprising:
  identifying one or more anomalous records identified in a knowledge base;
  generating a list of ranked candidate explanations for the one or more anomalous records, wherein each of the ranked candidate explanations are generated according to a knowledge domain, one or more recommendation models, one or more statistical models, one or more machine learning models, one or more rule-based models, one or more reasoning models, or a combination thereof; and initiating an active learning dialog with one or more users to increase accuracy of the knowledge base, a domain knowledge, and each of the ranked candidate explanations.

2. The method of claim 1, further including ranking each of the ranked candidate explanations according to a weight and a confidence score.

3. The method of claim 1, further including ranking each of the ranked candidate explanations according to a level of confidence of evidence in the knowledge base associated with each of the ranked candidate explanations.

4. The method of claim 1, further including updating the knowledge base using feedback from the one or more users.

5. The method of claim 1, further including building the one or more recommendation models to generate evidence to support each of the ranked candidate explanations.

6. The method of claim 1, further including initializing a machine learning mechanism to trigger an active learning operation and to learn, approve, reject, rank, or recommend each of the ranked candidate explanations and evidence in support of each of the ranked candidate explanations, wherein the evidence includes a set of similar cases from other patients or domain experts, domain experts, the domain knowledge, historical data, or a combination thereof.

7. A system for intelligent learning for explaining anomalies, comprising:
one or more computers with executable instructions that when executed cause the system to:
identify one or more anomalous records identified in a knowledge base;
generate list of ranked candidate explanations for the one or more anomalous records, wherein each of the ranked candidate explanations are generated according to a knowledge domain, one or more recommendation models, one or more statistical models, one or more machine learning models, one or more rule-based models, one or more reasoning models or a combination thereof; and
initiate an active learning dialog with one or more users to increase accuracy of the knowledge base, a domain knowledge, and each of the ranked candidate explanations.

8. The system of claim 7, wherein the executable instructions rank each of the ranked candidate explanations according to a weight and a confidence score.

9. The system of claim 7, wherein the executable instructions rank each of the ranked candidate explanations according to a level of confidence of evidence in the knowledge base associated with each of the ranked candidate explanations.

10. The system of claim 7, wherein the executable instructions updating the knowledge base using feedback from the one or more users.

11. The system of claim 7, wherein the executable instructions build the one or more recommendation models to generate evidence to support each of the ranked candidate explanations.

12. The system of claim 7, wherein the executable instructions initialize a machine learning mechanism to trigger an active learning operation and to learn, approve, reject, rank, or recommend each of the ranked candidate explanations and evidence in support of each of the ranked candidate explanations, wherein the evidence includes a set of similar cases from other patients or domain experts, domain experts, the domain knowledge, historical data, or a combination thereof.

13. A computer program product for intelligent learning for explaining anomalies by a processor, the computer program product comprising a non-transitory computer-readable storage medium having computer-readable program code portions stored therein, the computer-readable program code portions comprising:
an executable portion that identifies one or more anomalous records identified in a knowledge base;
an executable portion that generates a list of ranked candidate explanations for the one or more anomalous records, wherein each of the ranked candidate explanations are generated according to a knowledge domain, one or more recommendation models, one or more statistical models, one or more machine learning models, one or more rule-based models, one or more reasoning models, or a combination thereof; and
an executable portion that initiate an active learning dialog with one or more users to increase accuracy of the knowledge base, a domain knowledge, and each of the ranked candidate explanations.

14. The computer program product of claim 13, further including an executable portion that:
ranks each of the ranked candidate explanations according to a weight and a confidence score; and
ranks each of the ranked candidate explanations according to a level of confidence of evidence in the knowledge base associated with each of the ranked candidate explanations.

15. The computer program product of claim 13, further including an executable portion that updates the knowledge base using feedback from the one or more users.

16. The computer program product of claim 13, further including an executable portion that builds the one or more recommendation models to generate evidence to support each of the ranked candidate explanations.

17. The computer program product of claim 13, further including an executable portion that initializes a machine learning mechanism to trigger an active learning operation and to learn, approve, reject, rank, or recommend each of the ranked candidate explanations and evidence in support of each of the ranked candidate explanations, wherein the evidence includes a set of similar cases from other patients or domain experts, domain experts, the domain knowledge, historical data, or a combination thereof.

* * * * *